(12) United States Patent
Ziese

(10) Patent No.: US 6,484,315 B1
(45) Date of Patent: Nov. 19, 2002

(54) METHOD AND SYSTEM FOR DYNAMICALLY DISTRIBUTING UPDATES IN A NETWORK

(75) Inventor: Kevin J. Ziese, Dripping Springs, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/241,823

(22) Filed: Feb. 1, 1999

(51) Int. Cl.⁷ .............................................. G06F 9/445
(52) U.S. Cl. ....................... 717/173; 717/178; 707/203; 709/220; 709/221
(58) Field of Search .................. 713/100, 153, 713/163, 187, 191, 200; 709/203, 201, 221, 220, 227, 217–222; 707/203, 202, 204, 10; 340/541, 540; 714/13, 18, 38; 717/168–178

(56) References Cited

U.S. PATENT DOCUMENTS

| | | | | |
|---|---|---|---|---|
| 4,456,788 A | * | 6/1984 | Kline et al. .................. 379/137 |
| 5,032,979 A | | 7/1991 | Hecht et al. ................. 364/200 |
| 5,101,402 A | | 3/1992 | Chiu et al. .................... 370/17 |
| 5,278,901 A | | 1/1994 | Shieh et al. ..................... 380/4 |
| 5,414,833 A | | 5/1995 | Hershey et al. ............. 395/575 |
| 5,448,724 A | | 9/1995 | Hayashi ................. 395/182.02 |
| 5,488,715 A | | 1/1996 | Wainwright ........... 395/182.02 |
| 5,524,238 A | | 6/1996 | Miller et al. ................. 395/600 |
| 5,557,742 A | | 9/1996 | Smaha et al. ................ 395/186 |
| 5,606,668 A | | 2/1997 | Shwed .................. 395/200.11 |
| 5,621,889 A | | 4/1997 | Lermuzeaux et al. ....... 395/186 |
| 5,699,513 A | | 12/1997 | Feigen et al. .......... 395/187.01 |
| 5,715,462 A | * | 2/1998 | Iwamoto et al. ............. 717/173 |
| 5,793,763 A | | 8/1998 | Mayes et al. ................ 370/389 |
| 5,796,942 A | | 8/1998 | Esbensen ............... 395/187.01 |
| 5,798,706 A | | 8/1998 | Kraemer et al. ........ 340/825.07 |
| 5,805,801 A | | 9/1998 | Holloway et al. ...... 395/187.01 |
| 5,826,014 A | | 10/1998 | Coley et al. ............ 395/187.01 |
| 5,835,911 A | * | 11/1998 | Nakagawa et al. .......... 707/203 |
| 5,860,012 A | * | 1/1999 | Luu ............................. 717/11 |
| 5,919,247 A | * | 7/1999 | Hoff et al. ................... 709/217 |
| 5,919,257 A | | 7/1999 | Trostle ........................ 713/200 |
| 5,931,946 A | | 8/1999 | Terada et al. ............... 713/201 |
| 5,991,881 A | | 11/1999 | Conklin et al. ............. 713/201 |
| 6,006,034 A | * | 12/1999 | Heath et al. .................. 717/11 |
| 6,009,274 A | * | 12/1999 | Fletcher et al. ............... 717/11 |
| 6,138,153 A | * | 10/2000 | Collins, III et al ......... 709/221 |
| 6,154,878 A | * | 11/2000 | Saboff .......................... 717/11 |
| 6,161,218 A | * | 12/2000 | Taylor ........................ 717/174 |
| 6,338,149 B1 | * | 1/2002 | Ciccone, Jr. et al. ......... 714/38 |

OTHER PUBLICATIONS

"Introduction to Algorithms," by Thomas H. Cormen, Charles E. Leiserson, Ronald L. Rivest, Chap. 34, pp. 853–885, Copyright © 1990.

"Preliminary Report on Advanced Security Audit Trail Analysis on UNIX," N. Habra et al., pp. 1–34 (found at http://www.cs.purdue.edu/coast/archive/data/categ24.html), Sep. 1994.

"IDIOT–Users Guide," M. Crosbie, et al., pp. 1–63, (found at http://www.cs.purdue.edu/coast/archive/data/categ24.html), Sep. 1996.

"An Introduction to Intrusion Detection," A. Sundaram, pp. 1–10, (found at http://www.cs.purdue.edu/coast/archive/data/categ24.html), unknown.

(List continued on next page.)

*Primary Examiner*—Tuan Q. Dam
(74) *Attorney, Agent, or Firm*—Baker Botts L.L.P.

(57) ABSTRACT

A first version of a program operating at a network site is updated by automatically downloading from a remote site any update for the program in response to an automated event. A downloaded update is installed to generate a second version of the program. The second version of the program is operated at the network site in place of the first version.

9 Claims, 2 Drawing Sheets

OTHER PUBLICATIONS

"Use of A Taxonomy of Security Faults," T. Aslam, et al., pp. 1–10, (found at http://www.cs.purdue.edu/coast/archive/data/categ24.html), Sep. 1996.

"Artificial Intelligence and Intrusion Detection: Current and Future Directions," Jeremy Frank, pp. 1–12, (found at http://www.cs.purdue.edu/coast/archive/data/categ24.html), Jun. 1994.

"ASAX Conceptual Overview," ASAX Brochure, A. Mounji, (found at http://www.cs.purdue.edu/coast/archive/data/categ24.html), Unknown.

"GrIDS–A Graph Based Intrusion Detection System For Large Networks," S. Staniford–Chen, et al., 10 pages, (found at http://www.cs.purdue.edu/coast/archive/data/categ24.html), Unknown.

"A Pattern Matching Model For Misuse Intrusion Detection," S. Kumar, et al., pp. 1–11, (found at http://www.cs.purdue.edu/coast/archive/data/categ24.html), Unknown.

"An Application of Pattern Matching in Intrusion Detection", S. Kumar, et al., pp. 1–55, (found at http://www.cs.purdue.edu/coast/archive/data/categ24.html), Jun. 1994.

"A Software Architecture to Support Misuse Intrusion Detection", S. Kumar, et al., pp. 1–17, (found at http://www.cs.purdue.edu/coast/archive/data/categ24.html), Mar. 1995.

"Applying Genetic Programming to Intrusion Detection", M. Crosbie, et al., pp. 1–8, (found at http://www.cs.purdue.edu/coast/archive/data/categ24.html), Unknown.

"Defending a Computer System Using Autonomous Agents," M. Crosbie, et al., pp. 1–11, (found at http://www.cs.purdue.edu/coast/archive/data/categ24.html), Mar. 1994.

"Analysis Of An Algorithm For Distributed Recognition And Accountability", C. Ko, et al., pp. 1–11, (found at http://www.cs.purdue.edu/coast/archive/data/categ24.html), Unknown.

"A Standard Audit Trail Format", Matt Bishop, 10 pages, (found at http://www.cs.purdue.edu/coast/archive/data/categ24.html), Unknown.

Master Thesis entitled USTAT A Real–time Intrusion Detection System for UNIX, University of California, K. Ilgun, pp. 1–204, (found at http://www.cs.purdue.edu/coast/archive/data/categ24.html), Nov. 1992.

"A Weakness in the 4.2BSD Unix TCP/IP Software", R. Morris, 4 pages, (found at http://www.cs.purdue.edu/coast/archive/data/categ30.html), Feb. 1985.

"The Architecture and Implementation of Network–Layer Security Under Unix", J. Ioannidis, et al., 11 pages, (found at http://www.cs.purdue.edu/coast/archive/data/categ30.html), Unknown.

"A Best–Case Network Performance Model", S.M. Bellovin, pp. 1–10, (found at http://www.cs.purdue.edu/coast/archive/data/categ30.html), Feb. 1992.

"OARnet Security Procedures", K. Varadhan, pp. 1–14, (found at http://www.cs.purdue.edu/coast/archive/data/categ30.html), Sep. 1992.

"Paving The Road To Network Security Or The Value Of Small Cobblestones", H. Orman, et al., pp. 1–17, (found at http://www.cs.purdue.edu/coast/archive/data/categ30.html), May 1994.

"Packets Found on an Internet", S. Bellovin, pp. 1–6, (found at http://www.cs.purdue.edu/coast/archive/data/categ30.html), Aug. 1993.

"Security Problems in the TCP/IP Protocol Suite", S.M. Bellovin, (reprinted from Computer Communication Review, vol. 19, No. 2, pp. 32–48)pp. 1–17, Apr. 1989.

"A Security Analysis of the NTP: Protocol", Matt Bishop, pp. 1–20, (found at http://www.cs.purdue.edu/coast/archive/data/categ30.html), 1990.

"WAN–hacking with AutoHack–Auditing Security Behind the Firewall", Alec Muffett, 14 pages, (found at http://www.cs.purdue.edu/coast/archive/data/categ30.html), Jun. 1995.

"ACMAINT: An Account Creation and Maintenance System for Distributed UNIX Systems", D.A. Curry, et al., pp. 1–9, (found at http://www.cs.purdue.edu/coast/archive/data/categ30.html), Oct. 1990.

"NFS Tracing By Passive Network Monitoring", Matt Blaze, 11 pages, (found at http://www.cs.purdue.edu/coast/archive/data/categ30.html), Unknown.

"Pseudo–Network Drivers and Virtual Networks", S.M. Bellovin, 15 pages, (found at http://www.cs.purdue.edu/coast/archive/data/categ30.html), Unknown.

Masters Thesis entitled "Addressing Weaknesses In The Domain Name System Protocol", Purdue University, Christoph Schuba, pp. 1–87., (found at http://www.cs.purdue.edu/coast/archive/data/categ30.html), Aug. 1993.

"Countering Abuse of Name–Based Authentication", C.L. Schuba, et al., pp. 1–21., (found at http://www.cs.purdue.edu/coast/archive/data/categ30.html), Unknown.

"The 'Session Tty' Manager", S.M. Bellovin, pp. 1–16., (found at http://www.cs.purdue.edu/coast/archive/data/categ30.html), Unknown.

"Secure RPC Authentication (SRA) for Telnet and FTP", D.R. Safford, et al., pp. 1–5, (found at http://www.cs.purdue.edu/coast/archive/data/categ30.html), 1993.

"A Reliable and Secure Unix Connection Service", D. Draheim, et al., pp. 1–12, (found at http://www.cs.purdue.edu/coast/archive/data/categ30.html), Unknown.

"TCP Wrapper Network Monitoring, Access Control, and Booby Traps", Wietse Venema, 8 pages., (found at http://www.cs.purdue.edu/coast/archive/data/categ30.html), Unknown.

"Characteristics of Wide–Area TCP/IP Conversations", R. Cáceres, et al., pp. 1–12, (found at http://www.cs.purdue.ecu/coast/archive/data/categ30.html), Unknown.

"A Unix Network Protocol Security Study: Network Information Service", D.K. Hess, et al., 5 pages, (found at http://www.cs.purdue.edu/coast/archive/data/categ30.html), Unknown.

"Insertion, Evasion, and Denial of Service: Eluding Network Intrusion Detection", T.H. Ptacek et al., pp. 1–63, Jan. 1998.

"A Method to Detect Intrusive Activity in a Networked Environment", L.T. Heberlein et al., *Proc. of the 14th National Computer Security Conference*, Oct. 1991, pp. 362–371., (found at http://seclab.cs.ucdavis.edu/papers.html.).

"Internetwork Security Monitor: An Intrustion–Detection System for Large–Scale Networks", L.T. Heberlein et al., *Proc. of the 15th National Computer Security Conference*, Oct. 1992, pp. 262–271.

"Comparison Between Internet Security Scanner (ISS) 1.x and Internet Scanner 3.2", by Internet Security Systems., (found at http://www.iss.net), 1996.

"Automated Tools for Testing Computer System Vulnerability", W.T. Polk, 40 pages, Dec. 1992.

The Design of GrIDS: A Graph–Based Intrusion Detection System, S. Cheung et al., *U.C. Davis Computer Science Department Technical Report SCE–99–2*, 1999, pp. 1–47, (found at http://seclab.cs.ucdavis.edu/papers.html.), Jan. 26, 1999.

"Luby–Rackoff Backwards: Increasing Security by Making Block Ciphers Non–Invertible", M. Bellare, et al., *Advances in Cryptology–Eurocrypt 98 Proceedings, Lecture Notes in Computer Science*, vol. 1403 Springer–Verlat (1998) pp. 1–27, (found at http://seclab.cs.ucdavis.edu/papers.html.), Oct. 17, 1998.

"Detecting Disruptive Routers: A Distributed Network Monitoring Approach", K.A. Bradley, et al., *Proceedings of the 1998 IEEE Symposium on Security and Privacy*, Oakland, CA, pp. 115–124 (found at http://seclab.cs.ucdavis.edu/papers.html.), May 1998.

"Stack and Queue Integrity on Hostile Platforms", P.T. Devanbu, et al., *IEEE Symposium on Security and Privacy*, Oakland CA, (found at http://seclab.cs.ucdavis.edu/papers.html.), 1998.

"Techniques for Trusted Software Engineering", P.T. Davanbu et al., *Proceedings of the 20th International Conference on Software Engineering*, Kyoto, Japan, (found at http://seclab.cs.ucdavis.edu/papers.html.), 1998.

"Data Level Inference Detection in Database Systems", R.W. Yip et al., *Proceedings of the 11th IEEE Computer Security Foundations Workshop*, Rockport, Massachusetts, (found at http://seclab.cs.ucdavis.edu/papers.html.), 1998.

"The Design and Implementation of a Data Level Database Inference Detection System",. Yip et al., *Proceedings of the Twelfth Annual IFIP WG 11.3 Working Conference on Database Security*, Chalkidiki, Greece 14 pages, (found at http://seclab.cs.ucdavis.edu/papers.html.), 1998.

"Theft of Information in the Take–Grant Protection Model", Matt Bishop, 35 pages, *Journal of Computer Security* 4(4)(1996), (found at http://seclab.cs.ucdavis.edu/papers.html.), Mar. 13, 1997.

"Information Survivability, Security, and Fault Tolerance", Matt Bishop, position paper for the Information Survivability Workshop *Journal of Computer Security #6*) 1 page, (found at http://seclab.cs.ucdavis.edu/papers.html.), 1997.

"Teaching Computer Security", Matt Bishop, position paper for the *Workshop on Education in Computer Security*, Monterey CA, 3 pages, (found at http://seclab.cs.ucdavis.edu/papers.html.), 1997.

"Protecting Routing Infrastructures from Denial of Service Using Cooperative Intrusion Detection", S. Cheung et al., *Proc. new Security Paradigms Workshop*, Cumbria, UK 13 pages, (found at http://seclab.cs.ucdavis.edu/papers.html.), 1997.

"An Efficient Message Authentication Scheme for Link State Routing", S. Cheung, *Proc. 13th annual Computer Security Applications Conference*, San Diego, CA, 9 pages, (found at http://seclab.cs.ucdavis.edu/papers.html.), 1997.

"Cryptographic Verification of Test Coverage Claims", P. Devanbu et al., *Proceedings, Fifth ACM/SIGSOFT Conference on Foundations of Software Engineering* Zurich, Switzerland) (found at http://seclab.cs.ucdavis.edu/papers.html.), 1997.

"Property–Based Testing; A New Approach to Testing for Assurance", Fink et al., *ACM SIGSOFT Software Engineering Notes*, 22(4), (found at http://seclab.cs.ucdavis.edu/papers.html.), 1997.

"Checking for Race Conditions in File Accesses", Bishop et al., *Computing Systems 9*(2)., (found at http://seclab.cs.ucdavis.edu/papers.html.), 1996.

"An Isolated Network for Research", Bishop et al., *The 19th NISSC*, pp. 1–9, (found at http://seclab.cs.ucdavis.edu/papers.html.), 1996.

"Goal–Oriented Auditing and Logging", Bishop et al., submitted to IEEE Transactions on Computing Systems, (found at http://seclab.cs.ucdavis.edu/papers,html.), 1996.

"Extending The Take–Grant Protection System", J. Frank et al., The IEEE Oakland Conference on Research in Security and Privacy., (found at http://seclab.cs.ucdavis.edu/papers/html.), Dec. 5, 1996.

Network Security Via Reverse Engineering of TCP Code: Vulnerability Analysis and Proposed Solutions, Guha et al., *Proc. of the IEEE Infocom '96*, San Francisco, CA (found at http://seclab.cs.ucdavis.edu/papers.html.), 1996.

"Attack Class: Address Spoofing", Heberlein et al., The 19th National Information Systems Security Conference, (found at http://seclab.cs.ucdavis.edu/papers.html), 1996.

PhD. Theses entitled Execution Monitoring Of Security––Critical Programs In A Distributed System: A Specification–Based Approach, Calvin Cheuk Wang Ko, 111 pages, (found at http://seclab.cs.ucdavis.edu/papers.html), 1996.

"A Methodology for Testing Intrusion Detection Systems", Puketza et al., *IEEE Transactions on Software Engineering*, vol. 22, No. 10, (found at http://seclab.cs.ucdavis.edu/papers.html), 1996.

"The Exact Security of Digital Signatures–How to Sign with RSA and Rabin", Bellare et al. Earlier version appears in *Advances in Cryptology—Eurocrypt '96*, LNCS vol. 1070, U. Maurer ed., Springer–Verlag, pp. 399–416), (found at http://seclab.cs.ucdavis.edu/papers.html), 1996.

"How to Protect DES Against Exhaustive Key Search", Kilian et al., Advances in Cryptology—CRYPTO '96., (found at http://seclab.cs.ucdavis.edu/papers.html), 1996.

"GrIDS–A Graph Based Intrusion Detection System For Large Networks", Staniford–Chen et al., *The 19th NISSC*. 10 pages, (found at http://seclab.cs.ucdavis.edu/papers.html), 1996.

"NetKuang–A Multi–Host Configuration Vulnerability Checker", Zerkle et al., *Proc. of the 6th USENIX Security Symposium*, San Jose, CA., (found at http://seclab.cs.ucdavis.edu/papers.html), 1996.

"A Standard Audit Trail Format", Matt Bishop, *Proc. of the 1995 NISSC*, Baltimore, MD., (found at http://seclab.cs.ucdavis.edu/papers.html), 1995.

Abstract entitled Theft of Information in the Take–Grant Protection Model, Matt Bishop, *Journal of Computer Security*, vol. 3, No. 4, (found at http://seclab.cs.ucdavis.edu/papers.html), 1995.

"Improving System Security via Proactive Password Checking", Matt Bishop, *Computers & Security*, vol. 14, No. 3, pp. 233–249, (found at http://seclab.cs.ucdavis.edu/papers.html), 1995.

"Simulating Concurrent Intrusions for Testing Intrusion Detection Systems: Parallelizing Intrustions", Chung et al., *Proc. of the 1995 NISSC*, Baltimore, MD, 11 pages, (found at http://seclab.cs.ucdavis.edu/papers.html), 1995.

"Network Security Monitor", L. Todd Heberlein , *Lawrence Livermore National Laboratory project deliverable*, (found at http://seclab.cs.ucdavis.edu/papers.html), 1995.

"Audit Log Analysis Using the Visual Audit Browser Toolkit", Hoagland et al., *U.C. Davis Computer Science Department Technical Report CSE–95–11*, (found at http://seclab.cs.ucdavis.edu/papers.html), 1995.

"MCF: A Malicious Code Filter", R.W. Lo et al., *Computers & Security*, (1995) vol. 14, No. 6. (27 pages.), (found at http://seclab.cs.ucdavis.edu/papers.html), 1995.

"Bucket Hashing and its Application to Fast Message Authentication", Phillip Rogaway, *Acvances in Cryptology—CRYPTO '95*, (found at http://seclab.cs.ucdavis.edu/papers.html), 1995.

"Provably Secure Session Key Distribution–The Three Party Case", Bellare et al., *Proc. of the 27th Annual ACM Symposium on Theory of Computing*, Las Vegas, NV, (found at http://seclab.cs.ucdavis.edu/papers.html), 1995.

"XOR MACs: New Methods for Message Authentication Using Finite Pseudorandom Functions", Bellare et al.,*Advances in Cryptology—CRYPTO '95*, (found at http://seclab.cs.ucdavis.edu/papers.html), Oct. 1995.

"Holding Intruders Accountable on the Internet", Staniford-–Chen et al., *Proc. of the 1995 IEEE Symposium on Security and Privacy*, Oakland, CA, (11 pages) (found at http://seclab.cs.ucdavis.edu/papers.html), 1995.

"LAFS: A Logging and Auditing File System", Christopher Wee, *Proc. of the 11th Computer Security Applications Conference*, 10 pages, (found at http://seclab.cs.ucdavis.edu/papers.html), 1995.

"Towards a Property–based Testing Environment with Application to Security–Critical Software", Fink et al., *Proc. of the 4th irvine Software Symposium*. 10 pages, (found at http://seclab.cs.ucdavis.edu/papers.html), 1994.

"Property–based Testing of Privileged Programs", Fink et al., *Proc. of the 10th Annual Computer Security Applications Conference*, Orlando, FL. 10 pages, (found at http://seclab.cs.ucdavis.edu/papers.html), Dec. 1994.

"Arificial Intelligence and Intrusion Detection: Current and Future Directions", Jeremy Frank, *Proc. of the 17th National Computer Security Conference*. 12 pages, (found at http://seclab.cs.ucdavis.edu/papers.html). 1994.

"Automated Detection of Vulnerabilities in Privileged Programs by Execution Monitoring", Ko et al., *Proc. of the 10th Annual Computer Security Applications Conference*, Orlando, FL. (found at http://seclab.cs.ucdavis.edu/papers.html), 1994.

"Common Techniques in Fault–Tolerance and Security", Levitt et al., *Proc. of the Dependable Computing for Critical Applications 4*, San Diego, CA. 4 pages, (found at http://seclab.cs.ucdavis.edu/papers.html), 1994.

"Network Intrustion Detection", Mukherjee et al., *IEEE Network*, May–Jun. 1994, vol. 8, No. 3, pp. 26–41, (found at http://seclab.cs.ucdavis.edu/papers.html), 1994.

"A New Suggestion for How to Encrypt with RSA", Bellare et al., *Eurocrypt '94*, 20 pages, (found at http://seclab.cs.ucdavis.edu/papers.html), 1994.

"The Security of Cipher Block Chaining", Bellare et al., *Advances in Cryptology—CRYPTO '94*, Santa Barbara CA. (19 pages.) (found at http://seclab.cs.ucdavis.edu/papers.html), 1994.

"Analysis Of An Algorithm For Distributed Recognition And Accountability", Ko et al., *Proc. 1st ACM Conference or Computer and Communication Security*. Fairfax, VA, Nov. 1993, 11 pages, (found at http://seclab.cs.ucdavis.edu/papers.html), 1993.

"Entity Authentication and Key Distribution". Bellare et al., *Advances in Cryptology—CRYPTO '93*, Santa Barbara, CA, Aug. 1993, pp. 232–249. (found at http://seclab.cs.ucdavis.edu/papers.html).

"Random Oracles are Practical: A Paradigm for Designing Efficient Protocols", Bellare et al., *Proc. of the 1st ACM Conference on Computer and Communication Security*, Fairfax, VA, Nov. 1993, pp. 1545–164. (found at http://seclab.cs.ucdavis.edu/papers.html).

"A Software–Optimized Encryption Algorithm", Rogaway et al., *Proc. of the Fast Software Encryption Cambridge Security Workshop*, Cambridge, UK (16 pages.) (found at http://seclab.cs.ucdavis.edu/papers.html), 1993.

"Anatomy of a Proactive Password Changer", Matt Bishop, *Proc. of the UNIX Security Symposium III* Baltimore, MD, 15 pages. (found at http://seclab.cs.ucdavis.edu/papers.html), 1992.

DIDS (Distributed Intrusion Detection System)– Motivation, Architecture, and An Early Prototype, Snapp et al., *Proc. 14th National Computer Security Conference*, Washington, DC (9 pages.) (found at http://seclab.cs.ucdavis.edu/papers.html), 1991.

"Proactive Password Checking", Matt Bishop, *Proc. of the 7th International Conference on Information Security*, May 1991, pp. 169–181. (found at http://seclab.cs.ucdavis.edu/papers.html).

Dissertation entitled Issues in Debugging Sequential and Concurrent Programs: Methods, Techniques, and Implementation, University of California, Wingshun Wilson Ho, 191 pages. (found at http://seclab.cs.ucdavis.edu/papers.html), 1992.

Abstract entitled "Collaboration Using Roles" by M. Bishop, *Software—Practice and Experience*, vol. 20, No. 5, May 1990. (found at http://seclab.cs.ucdavis.edu/papers.html).

Abstract entitled "An Extendable Password Checker" by M. Bishop, *Proc. UNIX Security II* Portland, OR, Aug. 27–28, 1990, pp. 15–16, (found at http://seclab.cs.ucdavis.edu/papers.html).

Abstract entitled "A Security Analysis of the NTP Protocol Version 2" by M. Bishop, Dec. 1990.

Abstract entitled "A Little Knowledge Goes a Long Way: Faster Detection of Compromised Data in 2–D Tables" by D. Gusfield, *Proc. of the 1990 IEEE Symposium on Research in Security and Privacy*, Oakland, CA, May 7–9, 1990, pp. 86–94, (found at http://seclab.cs.ucdavis.edu/papers.html).

Abstract entitled "A Network Security Monitor" by L.T. Heberlein, G.V. Dias, K.N. Levitt, B. Mukherjee, and others, *Proc. of the 1990 IEE Symposium on Research in Security and Privacy*, Oakland, CA, May 7–9, 1990, pp. 296–304, (found at http://seclab.cs.ucdavis.edu/papers.html).

Abstract entitled "Static Analysis Virus Detection Tools for UNIX Systems" by P. Kerchen, et al., *Proc. 13th National Computer Security Conference*, Washington, DC, Oct. 1–4, 1990, pp. 350–365, (found at http://seclab.cs.ucdavis.edu/papers.html).

Abstract entitled "Security with Low Communication Overhead" by D. Beaver, et al., *Proc. Advances in Cryptology-–CRYPTO '90*, Santa Barbara, CA, Aug. 11–15, 1990, pp. 62–76, (found at http://seclab.cs.ucdavis.edu/papers,html).

Abstract entitled "The Round Complexity of Secure Protocols" by D. Beaver, et al., *Proc. of the 22nd Annual ACM Symposium on Theory of Computing*, Baltimore, MD, May 14–16, 1990, pp. 503–513. (found at http://seclab.cs.ucdavis.edu/papers.html).

Abstract entitled "PACLs: An Access Control List Approach to Anti–Viral Security" by D.R. Wichers, et al., *Proc. 13th National Computer Security Conference*, Washington, DC, Oct. 1–4, 1990, pp. 340–349. (found at http://seclab.cs.ucdavis.edu/papers.html).

Abstract entitled "Verification of Secure Distributed Systems in Higher Order Logic: A Modular Approach Using Generic Components" by J. Alves–Foss, K. Levitt, *Proc. of the 1991 IEEE Computer Society Symposium on Research in Security and Privacy*, Oakland CA May 20–22, 1991, pp. 122–135. (found at http://seclab.cs.ucdavis.edu/papers.html).

Abstract entitled "An Authentication Mechanism for USENET" by M. Bishop, *Proc. of the Winter 1991 USENIX Conference*. Jan. 21–25, 1991, pp. 281–287, (found at http://seclab.cs.ucdavis.edu/papers.html).

Abstract entitled "Password Management" by M. Bishop, *COMPCON Spring '91. Digest of Papers*. San Francisco, CA, Feb. 25–Mar. 1, 1991, pp. 167–169. (found at http://seclab.cs.ucdavis.edu/papers.html).

Abstract entitled "Teaching Computer Security" by M. Bishop, May 1993.

Abstract entitled "Recent Changes to Privacy Enhanced Electronic Mail" by M. Bishop, *Journal of Internetworking: Research and Experience*. vol. 4, No. 1, Mar. 1993, pp. 47–59. (found at http://seclab.cs.ucdavis.edu/papers.html).

Abstract entitled "A Modified Random Perturbation Method for Database Security" by P. Tendick, N. Matloff, *ACM Transactions on Database Systems*, Mar. 1994, vol. 19, No. 1, pp. 47–63, (found at http://seclab.cs.ucdavis.edu/papers.html).

Short presentation entitled "Intrusion Detection for network Infrastructures" by S. Cheung, K.N. Levitt, C. Ko. *The 1995 IEEE Symposium on Security and Privacy*, Oakland CA, May 1995.

Master Thesis entitled "Paradigms for the Reduction of Audit Trails" by B. Wetmore, pp. i–6. Unable to obtain entire thesis—portion downloaded from http://seclab.cs.ucdavis.edu/papers.html, 1993.

"Open System Security—an Architectural Framework" by Arto T. Karila, (found at http://www/cs.purdue.edu/coast/archive/data/categ.30.html), Jun. 1991.

Product description for "Oil Change" located on the Internet at http://store.mcafee.com/product.asp?ProductID=28&CategoryID–12, pp. 1–2, Unknown.

NetRanger 1.3 User's Guide, Copyright © 1997 by Wheel-Group Corporation, NetRanger product first available summer of 1996.

"Information Security and Privacy in Network Environments," by U.S. Office of Technology Assessment, OTA–TCT–606 (Washington DC: US Govenment Printing Office), Sep. 1994.

"A Few Attacks on the Zero Knowledge State in Novell's Netware" by Greg Miller, pp. 1–11. (found at http://www.cs.purdue.edu/coast/archive/data/categ30.html), Jul. 30, 1996.

* cited by examiner

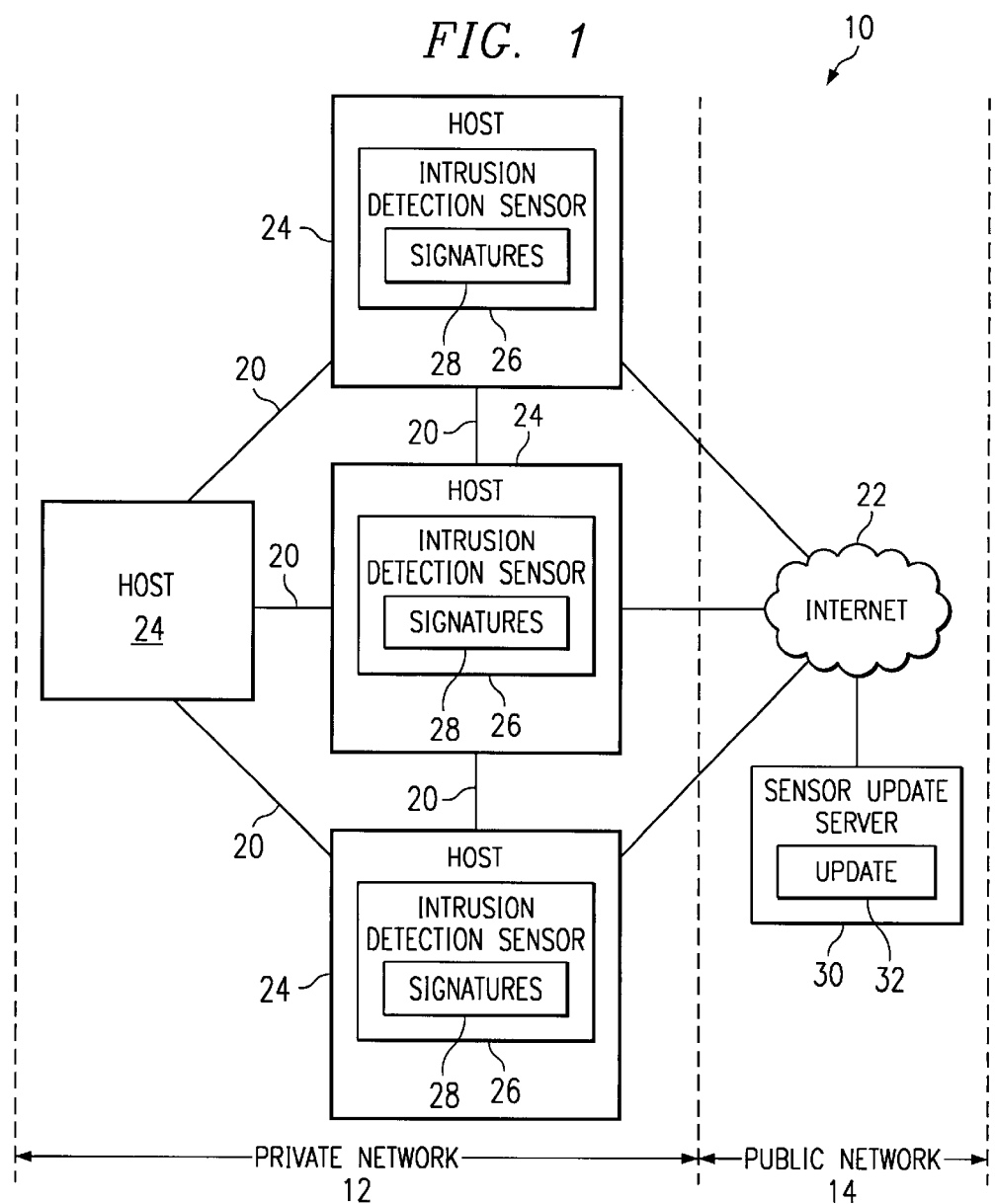
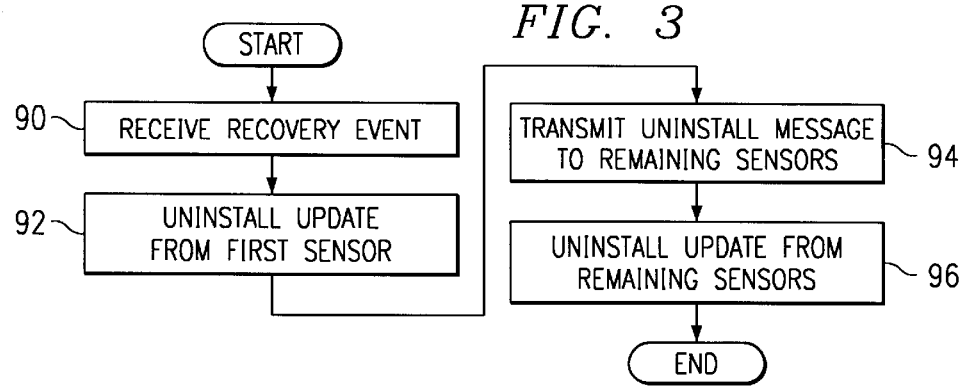

METHOD AND SYSTEM FOR DYNAMICALLY DISTRIBUTING UPDATES IN A NETWORK

TECHNICAL FIELD OF THE INVENTION

This invention relates generally to computer networking, and more particularly to a method and system for dynamically distributing updates in a network.

BACKGROUND OF THE INVENTION

Computer networks have become an increasingly important means for communicating public and private information between and within distributed locations. The Internet is one example of a public network commonly used for communicating public and private information. Internet web servers provide access to public information, such as news, business information, and government information, which the Internet makes readily available around the world. The Internet is also becoming a popular forum for business transactions, including securities transactions and sales of goods and services. A large number of people have come to depend upon reliable Internet access and secure communications on a day-by-day and even second-by-second basis. Like the Internet, private networks also have become common means for communicating important information. Private networks, such as company intranets, local area networks (LANs), and wide area networks (WANs) generally limit access on a user-by-user basis and communicate data over dedicated lines or by controlling access through passwords, encryption, or other security measures.

One danger to reliable and secure network communications is posed by hackers or other unauthorized users disrupting or interfering with network resources. The danger posed by unauthorized access to computer network resources can vary from simple embarrassment to substantial financial losses. For example, serious financial disruptions occur when hackers obtain financial account information or credit card information and use that information to misappropriate funds.

Typically, network administrators use various levels of security measures to protect the network against unauthorized use. Intrusion detection systems are commonly used to detect and identify unauthorized use of a computer network before the network resources and information are substantially disrupted or violated. In general, intrusion detection systems look for specific patterns in network traffic, known as intrusion signatures to detect malicious activity. Conventional intrusion detection systems often use finite state machines, simple pattern matching, or specialized algorithms to identify intrusion signatures in network traffic. Detected intrusion signatures are reported to network administration.

A problem with conventional intrusion detection systems is that when a new vulnerability, or type of attack on the network, is discovered, a new intrusion signature must be generated and installed for each intrusion detection system. As a result, unless a network administrator frequently checks for new signatures developed by an intrusion detection provider and installs the new signatures for each sensor in his or her system, the system will remain vulnerable to the new types of attack. Because new types of attacks appear more frequently than network administrators typically check with an intrusion detection provider for new signatures, networks often remain vulnerable to new types of attacks even though new signatures are available to identify and prevent such attacks.

SUMMARY OF THE INVENTION

The present invention provides a method and system for dynamically distributing intrusion detection and other types of updates in a network that substantially eliminate or reduce disadvantages and problems associated with prior methods and systems. In particular, the present invention automatically downloads updates from a remote site in response to a timed event.

In accordance with one embodiment of the present invention, a first version of a program operating at a network site is updated by automatically downloading from a remote site any update for the program in response to an automated event. A downloaded update is installed to generate a second version of the program. The second version of the program is operated at the network site in place of the first version.

More particularly, in accordance with a particular embodiment of the present invention, the automated event is a timed event. In this embodiment, the first version of the program is aged and the timed event is the first version reaching a specified age. The specified age may be 24 hours or other suitable age. In other embodiments, the timed event may be a specified time such that any updates are automatically downloaded once a day, once a week, or at other suitable frequency.

After installation of a downloaded update, it may be determined whether the second version of the program is operating correctly. In response to incorrect operation of the second version, the first version of the program may be restored for operation at the network site. In response to correct operation of the second version, the downloaded update may be distributed to disparate network sites operating the first version of the program. There, the downloaded update may be installed to generate the second version of the program at the disparate network sites. The second version of the program is operated in the place of the first version at the disparate network sites.

Technical advantages of the present invention include providing an improved method and system for distributing updates in a network. In particular, programs are automatically updated by downloading and distributing an update in response to an automated event, such as a timed event. As a result, systems with a common program separately running at several sites may update each site with no or minimal operator interaction. In addition, updates may be automatic or with minimal operator interaction rolled back at each site in a system in response to an upgrade problem.

Additional technical advantages of the present invention include providing an improved intrusion detection system. In particular, each intrusion detection sensor may automatically connect to a remote site and download new intrusion detection signatures. Each sensor may also distribute the new signatures to related sensors within a system. Accordingly, network vulnerability due to new types of attacks is reduced. In addition, an intrusion detection service provider may update all of its customers by simply providing new signatures on a website from which each customer's system will automatically connect to and download the new signatures in accordance with a specified frequency. Accordingly, the costs of providing intrusion detection services are reduced.

Other technical advantages will be readily apparent to one skilled in the art for the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 1 is a block diagram illustrating a system for dynamically distributing intrusion detection signatures in accordance with one embodiment of the present invention;

FIG. 3 is a flow diagram illustrating a computer method for recovering from a problematic update in accordance with one embodiment of the present invention.

DETAILED DESCRIPTION OF THE INVENTION

Figure 2:
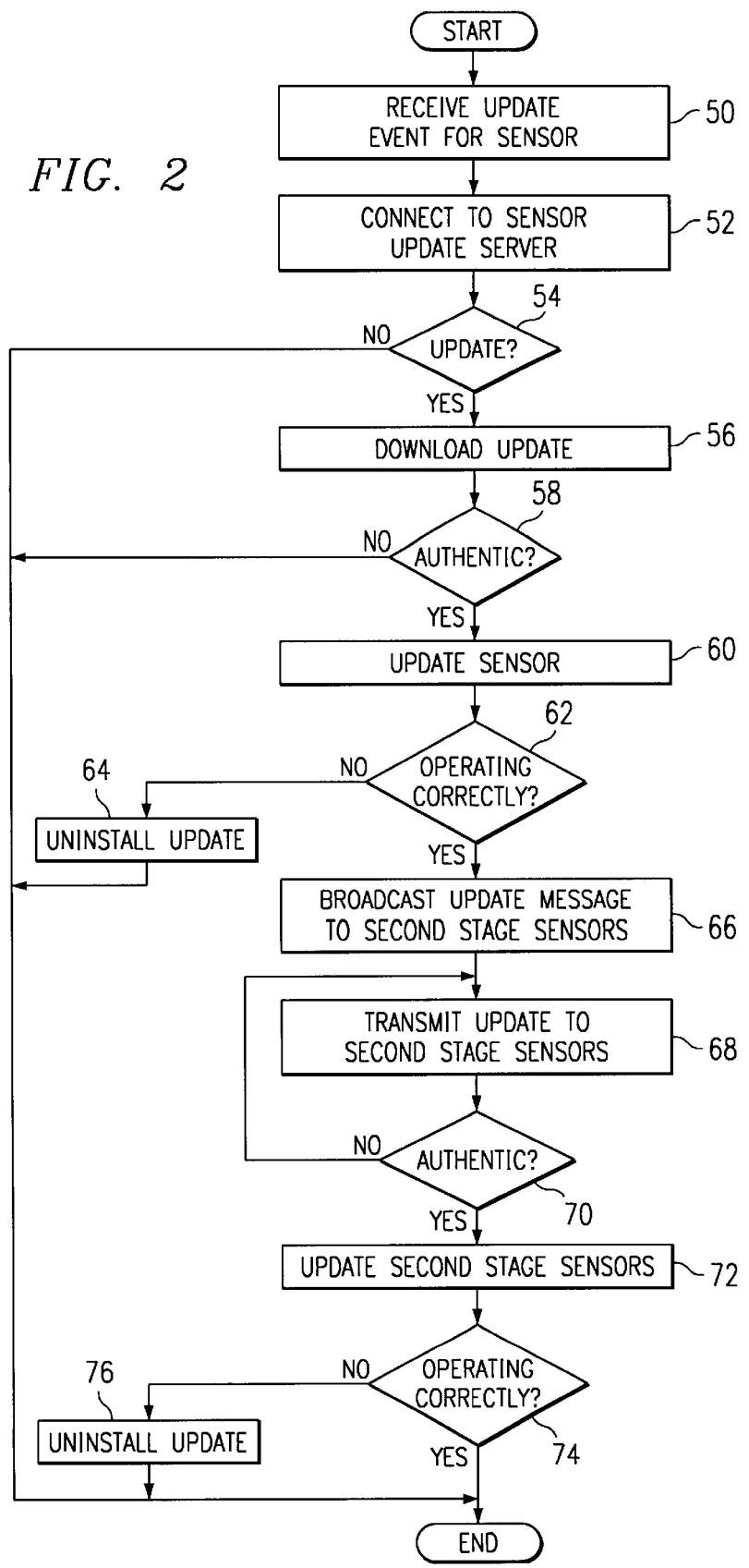
FIG. 2 is a flow diagram illustrating a computer method for dynamically distributing intrusion detection signatures in the network of FIG. 1.

FIG. 1 is a block diagram illustrating a system 10 for dynamically distributing updates in a network. In this embodiment, new intrusion signatures are distributed to remote intrusion detection sensors. The sensors use the intrusion signatures to detect and report unauthorized entry. It will be understood that the present invention may be used to distribute other suitable types of updates to intrusion detection and other suitable types of applications within a network.

Referring to FIG. 1, the system 10 includes a private network 12 and a public network 14. For the embodiment of FIG. 1, the private network is an Intranet 20 and the public network is an Internet 22. It will be understood that the private and public networks 12 and 14 may be other suitable types of networks.

The Intranet 20 includes a network interconnecting a plurality of hosts 24. The network is a local area network (LAN), a wide area network (WAN), or other suitable type of link capable of communicating data between the hosts 24. For the local area network embodiment, the network may be an Ethernet.

The hosts 24 are each a computer such as a personal computer, file server, workstation, minicomputer, mainframe or any general purpose or other computer or device capable of communicating with other computers or devices over a network. The hosts 24 operating on the border between the Intranet 20 and Internet 22 each include an intrusion detection sensor 26 for detecting and reporting unauthorized entry. As used herein, each means each of at least a subset of the identified items.

The intrusion detection sensors 26 each include a common set of intrusion signatures 28. The intrusion signatures 28 comprise patterns of network activity that denote or indicate unauthorized access or other harmful activity capable of damaging the host 24 or other aspect of the private network 12. Generally described, the intrusion detection sensors 26 detect such unauthorized access or attacks upon the host 24 by matching network traffic to the intrusion signatures 28.

The Internet 22 includes a sensor update server 30. The sensor update server 30 may be virtually any type of computer capable of storing intrusion updates 32 and communicating with other computers or devices over the Internet 22. The intrusion update 32 includes new intrusion signatures generated by an intrusion detection service provider in response to new types of attacks. The intrusion detection service provider generates the new signatures and provides them as the update 32 on a web page at the sensor update server 30 to allow customers to access the new signatures over the Internet 22. As described in more detail below, the update 32 is downloaded by customers over the Internet 22 and the new signatures added to the intrusion signatures 28 residing on the host 24. In this way, the intrusion detection sensors 26 are kept up-to-date and able to detect and report new types of network and/or host based attacks.

FIG. 2 is a flow diagram illustrating a computer method for dynamically distributing intrusion detection updates over the Internet 22 or other suitable network. It will be understood that other types of updates for other types of applications may be similarly distributed over the Internet 22 or other suitable network without departing from the scope of the present invention.

Referring to FIG. 2, the method begins at step 50 in which a specified event is received. The specified event may be an automated event or a user initiated event. The automated event may be any event generated by the sensor or other software or hardware in accordance with predefined instructions or logical set of such events. In one embodiment, the automated event is a timed event that is directly or indirectly based upon the reaching or passing of a specified time. For this embodiment, the intrusion detection sensors 26 may automatically age the intrusion signatures 28 after each update to allow the intrusion detection sensors 26 to automatically determine when the intrusion signatures 28 may be in need of updating. In this embodiment, an update event is generated in response to the intrusion signatures 28 reaching a specified age. The age is twenty-four hours or other suitable time period that will allow the intrusion signatures 28 to be updated at a frequency that will minimize vulnerability of the private network 12 to new types of attacks. An event or action is in response to a specified event when the occurrence of the specified event directly or indirectly triggers, at least in part, the responding event or action. Thus, other events may also be necessary to trigger the responding event or action, or intervene between the specified event and the responding event or action. The update event may be other suitable types of timed events such as, for example, a specified or scheduled time of day, week, or the like.

In a particular embodiment, a user may select a number of sensors to be subordinate to a primary intrusion detection sensor or set of primary sensors. In this embodiment, only the primary sensors are responsible for generating the update event and only their intrusion signatures 28 are aged. Alternatively, each intrusion detection sensor 26 may independently age its own intrusion signatures 28 and generate the update event in response to its intrusion signatures 28 reaching the specified age. In this embodiment, no one intrusion section sensor 26 or limited set of sensors is solely relied upon to initiate updating.

Proceeding to step 52, the intrusion detection sensor 26 generating the update event automatically connects to the sensor update server 30 over the Internet 22. At decisional step 54, the intrusion detection sensor 26 automatically determines whether the sensor update server 30 includes an update 32 for the intrusion signatures 28. In one embodiment, the intrusion detection sensor 26 may compare a time stamp of its last update to that of a current file on the sensor update server 30. In this embodiment, the current file is an update 32 if the time stamp for the file is later than that for the last update for the intrusion detection sensor 26. If an update 32 is not available, then the current set of intrusion signatures 28 are up-to-date and the No branch of decisional step 54 leads to the end of the process. Accordingly, the intrusion signatures 28 are updated only when needed. However, if an update 32 is available on the sensor update server 30, the Yes branch of decision step 54 leads to step 56.

At step 56, the intrusion detection sensor 26 automatically downloads the update 32. Preferably, the update 32 is downloaded in an encrypted format to prevent tampering and decrypted at the host 24. In addition, the update 32 may be protected by VPN, sequence numbering, other suitable form of secure communication, or a combination of forms. Next, at decisional step 58, the intrusion detection sensor 26 automatically authenticates the update 32. In one embodiment, the update 32 is authenticated by ensuring that the update is for the existing set of intrusion signatures 28. If the update 32 is not authentic, then it should not be installed and the No branch of decisional step 58 leads to the end of the process. Accordingly, an update 32 that cannot be authenticated is not installed. However, if the update 32 is authentic, the Yes branch of decisional step 58 leads to step 60.

At step 60, the intrusion detection sensor 26 automatically installs the update 32 to add the new signatures to the preexisting intrusion signatures 28. Next, at decisional step 62, the intrusion detection sensor 26 automatically determines if it is operating correctly with the installed update by comparing its operation to specified parameters, limits, and the like. If the intrusion detection sensor 26 is not operating correctly, then the No branch of decisional step 62 leads to step 64 where recovery processing is automatically initiated and the update 32 is uninstalled. Accordingly, the intrusion detection sensor 26 is returned to its previous state and the private network 12 is not left vulnerable by an incorrectly operating intrusion detection sensor 26. However, if the update intrusion sensor 26 is operating correctly, the Yes branch of decisional step 62 leads to step 66.

At step 66, the intrusion detection sensor 26 automatically broadcasts an update message over the Intranet 20. The update message informs the other intrusion detection sensors 26 of the availability of the update 32. Next, at step 68, the update 32 is automatically transmitted to the intrusion detection sensors 26 that responded to the update message. In one embodiment, the update message identifies the update and intrusion detection sensors 26 not having that update respond to request the update 32. The update 32 may be transmitted over the Intranet 20 in an encrypted format and a secure form and decrypted by each of the second stage intrusion detection sensors 26 as previously described for the first stage intrusion detection sensor 26 that originally received the update 32. If a sensor hierarchy is used, relationships between primary and secondary sensors may be predefined with the primary sensors each sending updates 32 to their respective secondary sensors. In addition, the relationship may be recursive with secondary sensors having their own children.

Proceeding to decisional step 70, each of the second stage intrusion detection sensors 26 authenticates the update 32 as previously described in connection with the first stage intrusion detection sensor 26. If the update 32 cannot be authenticated by a second stage intrusion detection sensor 26, the No branch of decisional step 70 returns to step 68 for that second stage intrusion detection sensor 26 where the update 32 is retransmitted to the intrusion detection sensor 26. Alternatively, or in response to several unsuccessful attempts to transmit an authentic update 32 to a second stage, the No branch of decisional step 70 may lead to the end of the process where the update 32 is not installed for that intrusion detection sensor 26. After an authentic update 32 is received by a second stage intrusion detection sensor 26, the Yes branch of decisional step 70 leads to step 72.

At step 72, the update 32 is automatically installed for each of the second stage intrusion detection sensors 26 receiving an authentic update 32 to generate an updated set of intrusion signatures 28. Accordingly, all intrusion detection sensors 26 in the private network 12 are automatically updated to protect all avenues of access to the private network 12 from the new types of attacks.

Proceeding to decisional step 74, each of the second stage intrusion detection sensors 26 determine if they are operating correctly with the installed update 32. If a second stage intrusion detection sensor 26 is not operating correctly, the No branch of decisional step 74 leads to step 76. At step 76, recovery process is initiated for that intrusion detection sensor 26 and the update 32 is uninstalled. In this way, it is ensured that each of the second stage intrusion detection sensors 26 will remain in operating condition. For each second stage intrusion detection sensor 26 operating correctly with the installed update 32, the Yes branch of decisional step 74 leads to the end of the process. Accordingly, all intrusion detection sensors 26 for the private network 12 have been automatically updated. Because user interaction is not required, the intrusion detection sensors 26 may be frequently and efficiently updated to ensure that the private network 12 is not vulnerable to new types of attacks.

It will be understood that the intrusion sensors 26 may be otherwise suitably updated without departing from the scope of the present invention. For example, although the method was described with the intrusion detection sensor 26 performing the specified actions, it will be understood that another application in or remotely from the hosts 24 may carry out the updating functionality identified for the intrusion detection sensor 26.

FIG. 3 illustrates a computer method for recovery processing in accordance with one embodiment of the present invention. Referring to FIG. 3, the method begins at step 90 in which a recovery event is received. The recovery event may be initiated by an intrusion detection sensor 26 in response to incorrect operation of the intrusion detection sensor 26. The recovery event may also be independently initiated by an operator to uninstall the update 32.

Proceeding to step 92, the update 32 is uninstalled from a first intrusion detection sensor 26. The first intrusion detection sensor 26 may be the first sensor 26 on which the update 32 was initially installed or another intrusion detection sensor 26 detecting incorrect operations or receiving a user command to initiate recovery processing. Uninstalling the update 32 returns the first intrusion detection sensor 26 to its previous state.

Next, at step 94, the first intrusion detection sensor 26 transmits a recovery message to the remaining intrusion detection sensors 26 in the private network 12 on which the update 32 was installed. Next, at step 96, each of the remaining intrusion detection sensors 26 uninstalls the update 32 in response to the recovery message. Accordingly, each intrusion detection sensor 26 in the private network 12 is returned to its previous state in response to a single recovery event. In this way, integrity of the private network 12 and the intrusion detection system for the private network 12 is maintained with each of the intrusion detection sensors 26 in a same state. Step 96 leads to the end of the process by which each of the intrusion detection sensors 26 have been returned to a same recovery state.

Although the present invention has been described with several embodiments, various changes and modifications may be suggested to one skilled in the art. It is intended that the present invention encompass such changes and modifications as fall within the scope of the appended claims.

What is claimed is:

1. A method for updating a first version of a program operating at a network site, comprising:
    in response to an automated event, automatically downloading from a remote site any update for the program;
    automatically installing a downloaded update to generate a second version of the program;
    after installation of the downloaded update, automatically determining whether the second version of the program is operating correctly;
    in response to correct operation of the second version, operating the second version of the program in place of the first version at the network site; and
    in response to incorrect operation of the second version, automatically restoring the first version of the program for operation at the network site.

2. A method for updating a first version of a program operating at a network site, comprising:
    in response to an automated event, automatically downloading from a remote site any update for the program;
    installing a downloaded update to generate a second version of the program; and
    operating the second version of the program in place of the first version at the network site;
    automatically distributing the downloaded update to a disparate network site operating the first version of the program;
    automatically installing the downloaded update to generate the second version of the program at the disparate network site; and
    automatically operating the second version of the program in place of the first version at the disparate network site.

3. A method for updating a first version of a program operating at a network site, comprising:
    in response to an automated event, automatically downloading from a remote site any update for the program;
    installing a downloaded update to generate a second version of the program;
    after installation of the downloaded update, automatically determining whether the second version of the program is operating correctly at the network site;
    in response to incorrect operation of the second version, automatically restoring the first version of the program for operation at the network site; and
    in response to correct operation of the second version at the network site:
        automatically distributing the downloaded update to a disparate network site operating the first version of the program;
        automatically installing the downloaded update to generate the second version of the program at the disparate network site; and
        automatically operating the second version of the program in place of the first version at the disparate network site.

4. A method for updating a first version of a program operating at a network site, comprising:
    in response to an automated event, automatically downloading from a remote site any update for the program;
    automatically installing a downloaded update to generate a second version of the program; and
    operating the second version of the program in place of the first version at the network site;
    broadcasting over a network an update message;
    receiving in response to the update message a request for the downloaded update from each of a plurality of disparate network sites operating the first version of the program;
    automatically distributing the downloaded update to the disparate network sites requesting the downloaded update;
    automatically installing the downloaded update to generate the second version of the program at each of the disparate network sites; and
    automatically operating the second version of the program in place of the first version at each of the disparate network sites.

5. The method of claim 4, further comprising:
    receiving a recovery event at one of the network sites;
    automatically restoring the first version of the program at the network site at which the recovery event was received;
    broadcasting a recovery message from the network site over the network; and
    automatically restoring the first version of the program at each of the remaining network sites operating the second version of the program.

6. The method of claim 5 wherein the recovery event occurs in response to incorrect operation of the second version of the program.

7. An intrusion detection system, comprising:
    a private network including a plurality of sites connected to a public network, each site including an intrusion detection sensor operating with a first set of intrusion detection signatures; and
    each of the intrusion detection sensors operable to automatically download from a remote site any update for the intrusion detection signatures in response to a specified event, to automatically install a downloaded update to generate a second set of intrusion detection signatures, to operate with the second set of intrusion detection signatures, and to automatically distribute the downloaded update to the remaining intrusion detection sensors for installation.

8. The system of claim 7, wherein the specified event is an automated event.

9. The system of claim 8, wherein the automated event is a timed event.

* * * * *